(12) United States Patent
Berding et al.

(10) Patent No.: US 9,196,295 B1
(45) Date of Patent: Nov. 24, 2015

(54) DISK TO MOTOR HUB SWAGE ATTACHMENT

(71) Applicant: Western Digital Technologies, Inc., Irvine, CA (US)

(72) Inventors: Keith R. Berding, San Jose, CA (US); David J. Bagaoisan, Santa Clara, CA (US); Yao-Hsin Huang, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 476 days.

(21) Appl. No.: 13/667,961

(22) Filed: Nov. 2, 2012

Related U.S. Application Data

(62) Division of application No. 12/184,120, filed on Jul. 31, 2008, now Pat. No. 8,322,021.

(51) Int. Cl.
*G11B 17/02* (2006.01)
*G11B 19/20* (2006.01)
*G11B 17/028* (2006.01)

(52) U.S. Cl.
CPC ........ *G11B 19/2009* (2013.01); *G11B 19/2045* (2013.01); *G11B 17/0282* (2013.01); *G11B 17/0287* (2013.01)

(58) Field of Classification Search
USPC ...................................................... 360/99.12
See application file for complete search history.

(56) References Cited

U.S. PATENT DOCUMENTS

| | | | |
|---|---|---|---|
| 4,245,960 A | 1/1981 | Matthews | |
| 4,320,568 A | 3/1982 | Herrod et al. | |
| 4,570,194 A | 2/1986 | Schatteman | |
| 5,267,106 A | 11/1993 | Brue et al. | |
| 5,270,999 A | 12/1993 | Chessman et al. | |
| 5,369,537 A | 11/1994 | Kinoshita et al. | |
| 5,384,677 A | 1/1995 | Morehouse et al. | |
| 5,486,962 A * | 1/1996 | Boutaghou | 360/99.12 |
| 5,504,638 A | 4/1996 | Kinoshita et al. | |
| 5,548,454 A | 8/1996 | Kawakubo et al. | |
| 5,550,690 A | 8/1996 | Boutaghou et al. | |
| 5,590,004 A | 12/1996 | Boutaghou | |
| 5,731,928 A | 3/1998 | Jabbari et al. | |
| 5,880,905 A | 3/1999 | Kazmierczak et al. | |
| 5,923,498 A | 7/1999 | Moir et al. | |
| 6,040,649 A * | 3/2000 | Horng | 310/91 |
| 6,163,520 A * | 12/2000 | Kobayashi et al. | 720/710 |
| 6,205,113 B1 | 3/2001 | Fahey et al. | |
| 6,556,376 B1 | 4/2003 | Boutaghou | |
| 6,567,238 B1 | 5/2003 | Renken et al. | |
| 6,624,968 B1 | 9/2003 | Chessman et al. | |

(Continued)

FOREIGN PATENT DOCUMENTS

JP 06111518 A 4/1994

OTHER PUBLICATIONS

Office Action dated Feb. 16, 2012 from U.S. Appl. No. 12/184,120, 14 pages.

(Continued)

*Primary Examiner* — Wayne Young
*Assistant Examiner* — Carlos E Garcia

(57) ABSTRACT

A disk drive includes a disk defining an opening, and a motor hub coupled to the disk. The motor hub further defines a swage ring extending at least partially into the opening of the disk, the swage ring swaged radially outwards into contact with the disk.

9 Claims, 14 Drawing Sheets

(56) References Cited

U.S. PATENT DOCUMENTS

| | | |
|---|---|---|
| 6,757,132 B1 | 6/2004 | Watson et al. |
| 6,760,188 B2 | 7/2004 | Teng et al. |
| 6,816,338 B1 | 11/2004 | Suwito |
| 8,322,021 B1 | 12/2012 | Berding et al. |
| 2003/0174440 A1* | 9/2003 | Kloeppel et al. ........... 360/99.12 |
| 2007/0133124 A1 | 6/2007 | Kim et al. |

OTHER PUBLICATIONS

Notice of Allowance dated Aug. 1, 2012 from U.S. Appl. No. 12/184,120, 8 pages.

* cited by examiner

DISK TO MOTOR HUB SWAGE ATTACHMENT

CROSS REFERENCE TO RELATED APPLICATIONS

This application is a divisional of U.S. patent application Ser. No. 12/184,120, filed on Jul. 31, 2008, which is hereby incorporated by reference in its entirety.

BACKGROUND

Disk drives typically include a spindle motor for rotating one or more disks in order to read data from and write data to surfaces of the disks. The spindle motor includes a stator having a plurality of coils, and a rotor having one or more rotor magnets and a rotating motor hub on which the disks may be mounted and clamped. Different coils of the stator are alternately energized to form a changing electromagnetic field that pulls/pushes the rotor magnets, thereby rotating the motor hub. Rotation of the motor hub, in turn, results in rotation of the disks mounted thereto.

Conventionally, disks have been mounted and clamped to the motor hub using a disk clamp axially loaded with at least one screw to sandwich the disks between the disk clamp and the motor hub. Relatively high axial loading may be required to keep the disks from slipping. If more than one disk is mounted on the motor hub, the disks may be separated by disk spacers that are positioned between the disks. After mounting the disks to the motor hub, the disk pack assembly (including the disks, disk spacers, disk clamp and screws) must often be carefully biased in order to minimize imbalances arising from off-center mounting of the disks.

Unfortunately, these conventional disk attachment techniques have a number of disadvantages. First, the process of mounting and balancing the disks can be complex and cumbersome. It may be difficult and time-consuming to perfectly balance the disk pack assembly. Second, the high axial loading created by the disk clamp may result in coning of the disks, whereby the outer diameters of the disks are bent out of plane. This coning effect is, of course, undesirable and may even result in servoing errors. Finally, conventional disk attachment can be a significant source of particulate contamination, as the screw tightening process typically yields metallic debris.

There is therefore a need for an improved disk attachment process.

DETAILED DESCRIPTION

Figure 1:
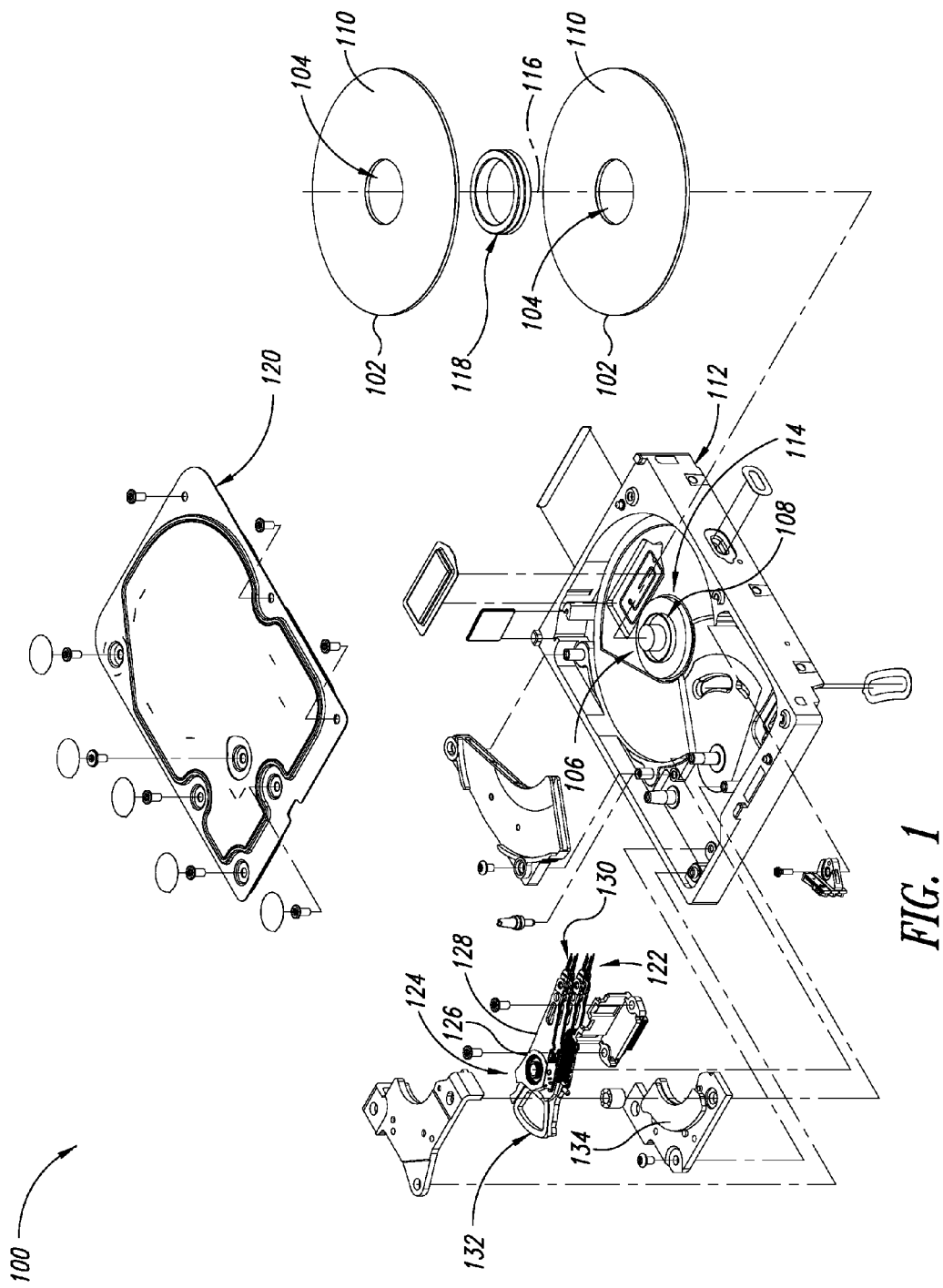
FIG. 1 is an exploded, perspective view generally illustrating a disk drive including an exemplary motor hub, according to one illustrated embodiment.

Referring to FIG. 1, a disk drive 100 is illustrated, according to one embodiment. The disk drive 100 comprises a disk 102 defining an opening 104, and a motor hub 106 coupled to the disk 102. The motor hub 106 defines a swage ring 108 extending at least partially into the opening 104 of the disk 102. Although not shown in the exploded view of FIG. 1, the swage ring 108 may be swaged radially outwards into contact with the disk 102. Thus, in one embodiment, the disk 102 may be retained on the motor hub 106 without a disk clamp and screws.

As illustrated herein, the disk drive 100 comprises a magnetic disk drive, and the methods described herein will be described in terms of such a disk drive. However, the methods and devices described herein may also be applied to and/or implemented in other disk drives, including, e.g., optical and magneto-optical disk drives.

The disk 102 may comprise any of a variety of magnetic or optical disk media having a substantially concentric opening 104 defined therethrough. As illustrated, the disk drive 100 may include two or more disks 102 that are similarly configured. Each disk 102 includes a disk surface 110, as well as an opposing disk surface not visible in FIG. 1. In one embodiment, the disk surfaces 110 comprise a plurality of generally concentric tracks for storing data. In other embodiments, more or fewer disks 102 may, of course, be included in the disk drive 100.

As illustrated, the motor hub 106 is coupled to and retains the disks 102. The motor hub 106 is rotatably attached to a disk drive base 112 of the disk drive 100, and forms a component of a motor 114. The motor 114 and motor hub 106 may be configured to rotate the disks 102 about a disk axis of rotation 116. The disks 102 may be stacked and separated with one or more disk spacers 118 positioned between them on the motor hub 106. As discussed in greater detail below, the motor hub 106 also defines the swage ring 108.

The disk drive 100 may further include a cover 120, which together with the disk drive base 112, may house the disks 102 and the motor 114. The disk drive 100 may also include a head stack assembly ("HSA") 122 rotatably attached to the disk drive base 112. The HSA 122 may include an actuator 124 comprising an actuator body 126 and one or more actuator arms 128 extending from the actuator body 126. The actuator body 126 may further be configured to rotate about an actuator pivot axis.

One or two head gimbal assemblies ("HGA") 130 may be attached to a distal end of each actuator arm 128. Each HGA 130 includes a head for reading data from and writing data to the disks 102. The HSA 122 may further include a coil 132 through which a changing electrical current is passed. The coil 132 interacts with one or more magnets 134 that are attached to the disk drive base 112 to form a voice coil motor ("VCM") for controllably rotating the HSA 122.

The disk drive 100 may further include a printed circuit board ("PCB") (not shown). The PCB may include, inter alia, a disk drive controller for controlling read and write operations and a servo control system for generating servo control signals to position the actuator arms 128 relative to the disks 102.

Figure 2:
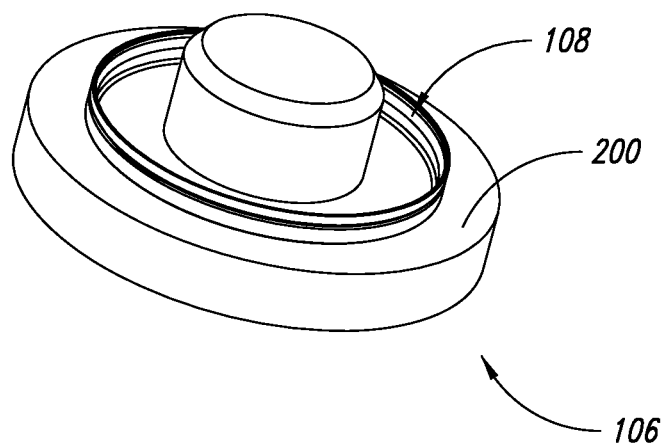
FIG. 2 is a perspective view illustrating an exemplary motor hub, according to one illustrated embodiment.
Figure 3:
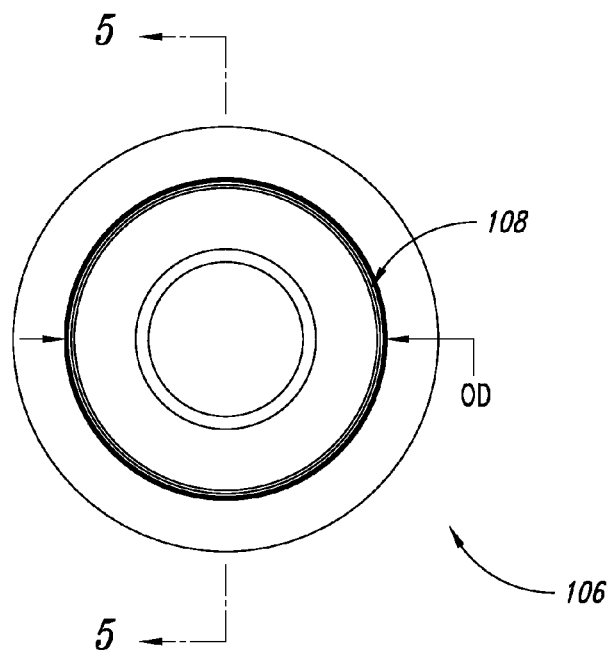
FIG. 3 is a top view of the motor hub of FIG. 2, according to one illustrated embodiment.
Figures 4, 5:
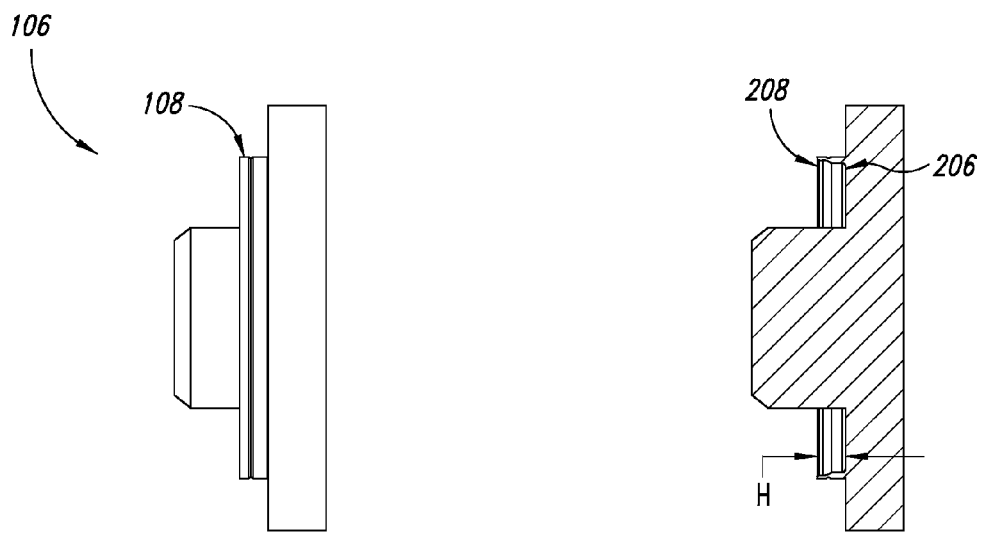
FIG. 4 is side view of the motor hub of FIG. 2, according to one illustrated embodiment.
FIG. 5 is a cross-sectional, side view of the motor hub of FIG. 2, according to one illustrated embodiment.

FIGS. 2-5 show the motor hub 106 separated from the motor 114 and from the rest of the disk drive 100, according to one illustrated embodiment. FIG. 2 shows a perspective view of the motor hub 106, while top, side and cross-sectional, side views of the motor hub 106 are shown in FIGS. 3-5, respectively.

As shown in greater detail in these Figures, the motor hub 106 defines the swage ring 108. The swage ring 108 may comprise any of a variety of generally ring-shaped features that may be swaged radially outwards into contact with the disk 102 positioned on the motor hub 106. In one embodiment, the swage ring 108 comprises a generally cylindrical wall extending from a flat upper surface 200 of the motor hub 106. When the motor hub 106 is coupled to the disk 102, the disk 102 may rest on the surface 200, while the swage ring 108 forms an interference fit with the disk 102.

In one embodiment, the motor hub 106 and the swage ring 108 are monolithic. That is, the motor hub 106 and the swage ring 108 may be formed from a single piece. In other embodiments, however, the motor hub 106 and the swage ring 108 may be formed separately, and the swage ring 108 may be coupled to the motor hub 106 in any of a variety of ways, such as via adhesives, metallic bonding, mechanical bonding, etc.

In one embodiment, the swage ring 108 (and the motor hub 106 as well) may be metallic. For example, the swage ring 108 may comprise aluminum, such as 6061 T6 aluminum, T4 aluminum, or aluminum having another temper. Such an aluminum swage ring may be relatively ductile, facilitating the swaging process. In other embodiments, other metals may be used. Of course, in still other embodiments, other types of materials may be used, so long as the materials may be swaged (i.e., plastically deformed).

As illustrated, the swage ring 108 is a continuous wall extending about a full 360° of the motor hub 106. However, in other embodiments, the swage ring 108 may comprise a broken ring. By interrupting the swage ring 108 at one or more points about the motor hub 106, stresses caused by the swaging process may be minimized. Indeed, in certain embodiments, the swage ring 108 may be formed by a plurality of separate walls extending from the surface 200. These walls may be shaped to correspond generally to the opening 104 through the disks 102, but the walls may be separated by relatively large gaps. For example, in one embodiment, the swage ring 108 may comprise four separate walls positioned approximately 90° from each other in order to spread the swaging force around the perimeter of a mounted disk 102.

As illustrated, the swage ring 108 may be generally centered about the disk axis of rotation 116. In one embodiment, by centering the swage ring 108 about the disk axis of rotation 116, the final disk pack assembly may be well-balanced, and vibrations emitted by the motor 114 during operation may be reduced. In addition, a centered swage ring 108 may obviate the need for a disk pack balancing operation after the disks 102 have been mounted to the motor hub 106.

The swage ring 108 may have any of a variety of pre-swaged outer diameters, illustrated as the length OD in FIG. 3. In general, the pre-swaged outer diameter OD of the swage ring 108 may be chosen to correspond generally to a pre-swaged inner diameter of the opening 104 of the disk 102. By tightening the tolerance between the pre-swaged outer diameter OD of the swage ring 108 and the pre-swaged inner diameter of the opening 104, the swaging stresses imposed upon the swage ring 108 may be reduced. In one embodiment, a ratio of the pre-swaged inner diameter of the opening 104 to the pre-swaged outer diameter OD of the swage ring 108 may be less than or equal to 1.05. In another embodiment, a ratio of the pre-swaged inner diameter of the opening 104 to the pre-swaged outer diameter OD of the swage ring 108 may be less than or equal to 1.005.

The swage ring 108 may also have any of a variety of heights, defined as the axial distance between a base 206 of the swage ring 108 and a top surface 208 of the swage ring 108, and illustrated as the height H in FIG. 5. In one embodiment, the height H of the swage ring 108 may be chosen based at least in part on a thickness of the disk 102, or on a combined thickness of a plurality of disks 102 and associated disk spacers 118. For example, the height H of the swage ring 108 may be chosen such that a top portion of the swage ring 108 extends through and beyond the opening(s) 104 of the disk(s) 102. In one embodiment, the height H of the swage ring 108 may be chosen such that the top surface 208 of the swage ring 108 is spaced apart axially from a top surface of the top disk 102 by at least 20% of a thickness of the disk 102. In such an embodiment, after swaging, a top portion of the swage ring 108 may flare radially outwardly beyond the opening 104 of the disk 102 (as described in greater detail below). In other embodiments, the height H of the swage ring 108 may be chosen such that it is equal to or even less than a thickness of the disk 102, or equal to or less than a combined thickness of a plurality of disks 102 and associated disk spacers 118. For example, the top surface 208 of the swage ring 108 may be positioned within the opening 104 of the disk 102 between a bottom surface of the disk 102 and a top surface of the disk 102.

Figure 6:
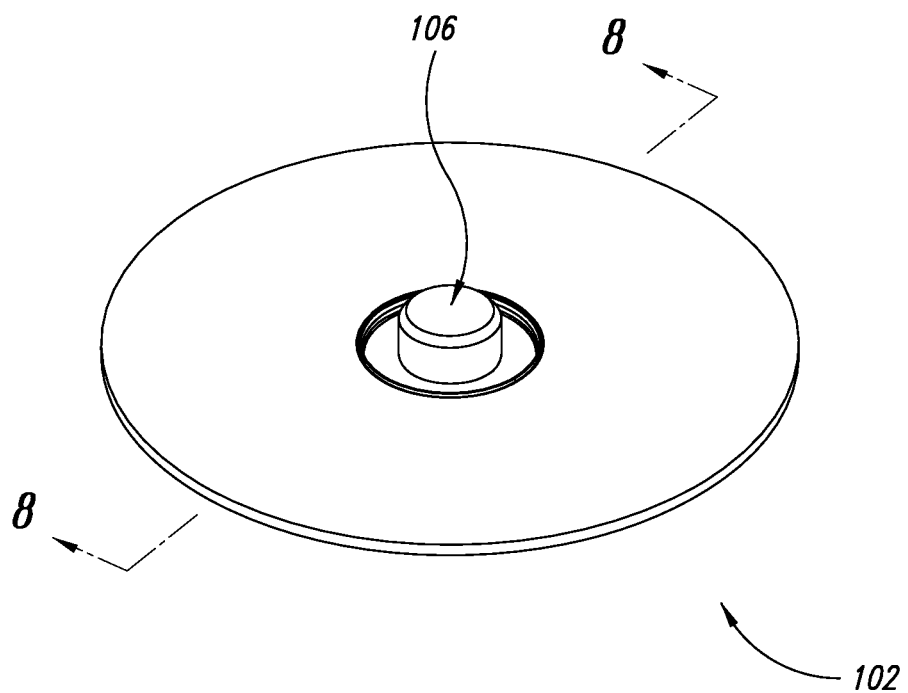
FIG. 6 is a perspective view of the motor hub of FIG. 2 having a disk positioned thereon, according to one illustrated embodiment.
Figure 7:
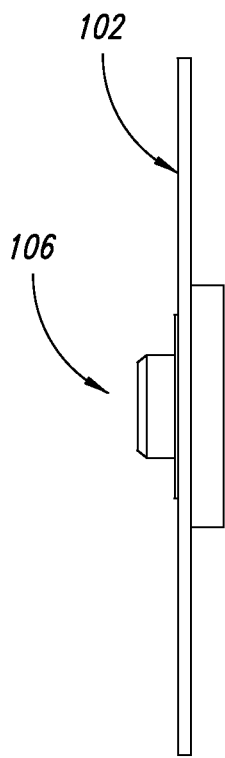
FIG. 7 is a side view of the motor hub and the disk of FIG. 6, according to one illustrated embodiment.
Figure 8:
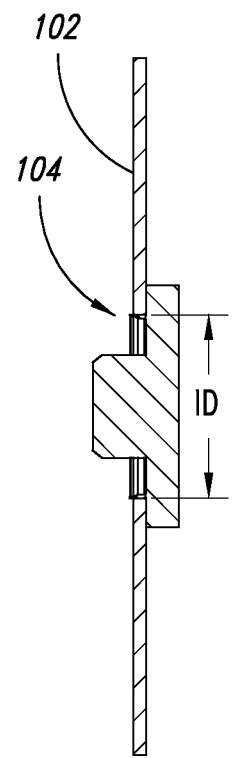
FIG. 8 is a cross-sectional, side view of the motor hub and the disk of FIG. 6, according to one illustrated embodiment.

FIGS. 6-8 show the motor hub 106 having a disk 102 positioned thereon, according to one illustrated embodiment.

FIG. 6 shows a perspective view of the motor hub 106 and disk 102, while side and cross-sectional views are shown in FIGS. 7 and 8.

As illustrated, the disk 102 defines an opening 104 having a pre-swaged inner diameter, illustrated as the length ID in FIG. 8. The opening 104 may have any of a variety of pre-swaged inner diameters ID, depending upon the overall dimensions of the disk 102, and desired application for the disk drive 100. As described above, the pre-swaged inner diameter ID of the opening 104 may be chosen to correspond to the pre-swaged outer diameter OD of the swage ring 108. In one embodiment, the ratio between the pre-swaged inner diameter ID of the opening 104 and the pre-swaged outer diameter OD of the swage ring 108 may be chosen such that the swage ring 108 will not be stretched during the swaging process beyond its breaking point.

In one embodiment, the disk 102 may be substantially metallic. For example, the disk 102 may comprise aluminum, such as 5086 aluminum. In other embodiments, other metals may be used as a primary component of the disk 102. Of course, a variety of other materials, such as glass, may also be used to form the disk 102, to enable different recording applications.

Figure 9:
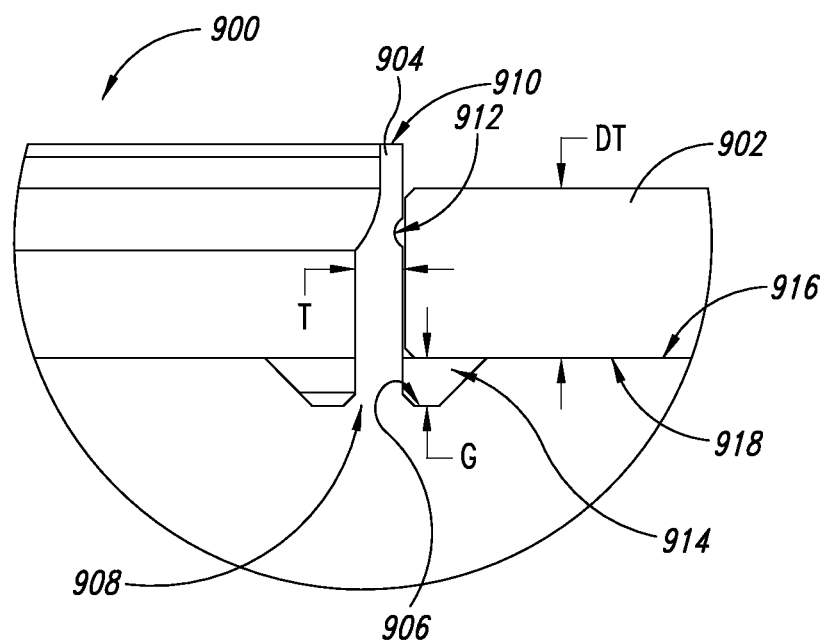
FIG. 9 is a magnified, cross-sectional, side view of an exemplary motor hub and a disk, according to one illustrated embodiment.

FIG. 9 shows a magnified, cross-sectional view of another exemplary motor hub 900 and disk 902, according to one illustrated embodiment. The motor hub 900 defines a swage ring 904 extending at least partially through an opening of the disk 902. As illustrated, the motor hub 900 and the swage ring 904 include a number of features that may facilitate the swaging process.

In one embodiment, the swage ring 904 comprises a generally cylindrical wall extending from a surface 906 of the motor hub 900. The swage ring 904 defines a base 908 proximate the surface 906 of the motor hub 900, and further defines a top surface 910.

The swage ring 904 may have any of a variety of radial thicknesses, defined as a thickness of the swage ring 904 in the radial direction, and illustrated as the thickness T. The radial thickness T of the swage ring 904 may be varied to affect the force required to swage the swage ring 904, the robustness of the swage ring 904, as well as the re-workability of the swage ring 904. In one embodiment, the radial thickness T of the swage ring 904 may be chosen to be substantially less than a disk thickness DT of the disk 902. For example, a ratio of the radial thickness T of the swage ring 904 to the disk thickness DT of the disk 902 may be less than or equal to 50%.

The swage ring 904 may also have a relatively complex profile, as illustrated in FIG. 9, such that the radial thickness T is not constant between the base 908 and the top surface 910 of the swage ring 904. In one embodiment, the swage ring 904 may define a first radial thickness near the base 908, a second radial thickness near the top surface 910, and may include contouring between the base 908 and the top surface 910. As illustrated, the swage ring 904 may also define a relatively thin, bend region 912, which might enable the swage ring 904 to bend preferentially in that region 912. Of course, in other embodiments, the swage ring 904 may have a variety of different profiles. For example, a simple cylindrical shape without a complex profile may be used in order to simplify a machining process used to form the swage ring 904.

In one embodiment, the motor hub 900 may include additional features. As illustrated, a step 914 may be formed in the motor hub 900, such that an upper surface 916 raised above the surface 906 supports the disk 902. In such an embodiment, a bottom surface 918 of the disk 902 may be spaced apart axially from the base 908 of the swage ring 904 by an axial gap G. In other embodiments, other structures for axially separating the bottom surface 918 of the disk 902 from the base 908 of the swage ring 904 may be used. For example, in one embodiment, a disk spacer may be provided between the disk 902 and the motor hub 900. However realized, the axial gap G may allow a greater percentage of the swage ring 904 to make contact with the disk 902 during swaging, thus improving the interference fit formed between these two components.

Figure 10:
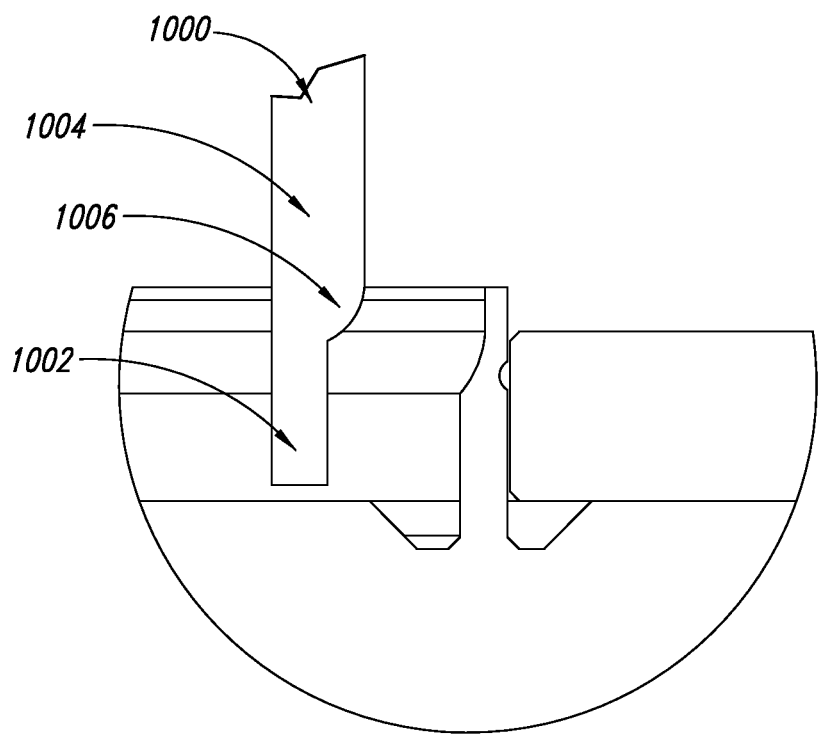
FIG. 10 is a magnified, cross-sectional, side view of the motor hub and the disk of FIG. 9 having a collet positioned nearby, according to one illustrated embodiment.
Figure 11:
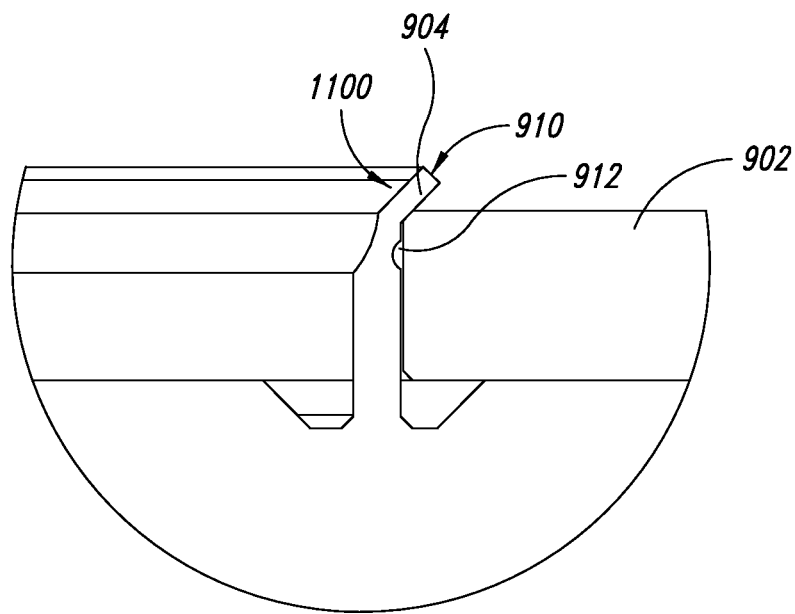
FIG. 11 is a magnified, cross-sectional, side view of the motor hub and the disk of FIG. 9 after a swaging operation, according to one embodiment.

FIG. 10 is similar to FIG. 9 but also shows a collet 1000 positioned proximate the swage ring 904. Although illustrated as a collet, any of a variety of expansion tools may be used during manufacturing in order to swage the swage ring 904 radially outwards into contact with the disk 902. For example, a cone-shaped tool pressed axially downward against the swage ring 904 may also be used to swage the swage ring 904 radially outwards. FIG. 11 illustrates the motor hub 900 and the disk 902 after a swaging operation using the collet 1000 has been performed.

The collet 1000 may comprise three or more arms (only one of which is visible in FIG. 10) configured to spread radially outwards in order to swage the swage ring 904 into contact with the disk 902. In one embodiment, the collet 1000 may be operated manually. However, in other embodiments, the collet 1000 may be operated automatically in a computer-controlled manufacturing process. The collet 1000 may also be configured to apply no more than a predetermined force during its radial expansion, and may be coupled to a sensor in order to ensure that the collet 1000 does not over-strain the swage ring 904 or the disk 902 during the swaging process.

In one embodiment, the collet 1000 may include a lower section 1002 associated with a first radius, and an upper section 1004 associated with a second radius larger than the first radius. A transition region 1006 between the lower section 1002 and the upper section 1004 may be rounded, such that the collet 1000 does not present an abrupt corner to the swage ring 904. During the swaging process, the lower section 1002 of the collet 1000 may be radially expanded in order to swage the swage ring 904 radially outwards into contact with the disk 902. Meanwhile, the upper section 1004 of the collet 1000 may be radially expanded to flare a top portion 1100 of the swage ring 904 outwardly beyond a swaged diameter of an opening of the disk 902, as illustrated in FIG. 11.

Figure 12B:
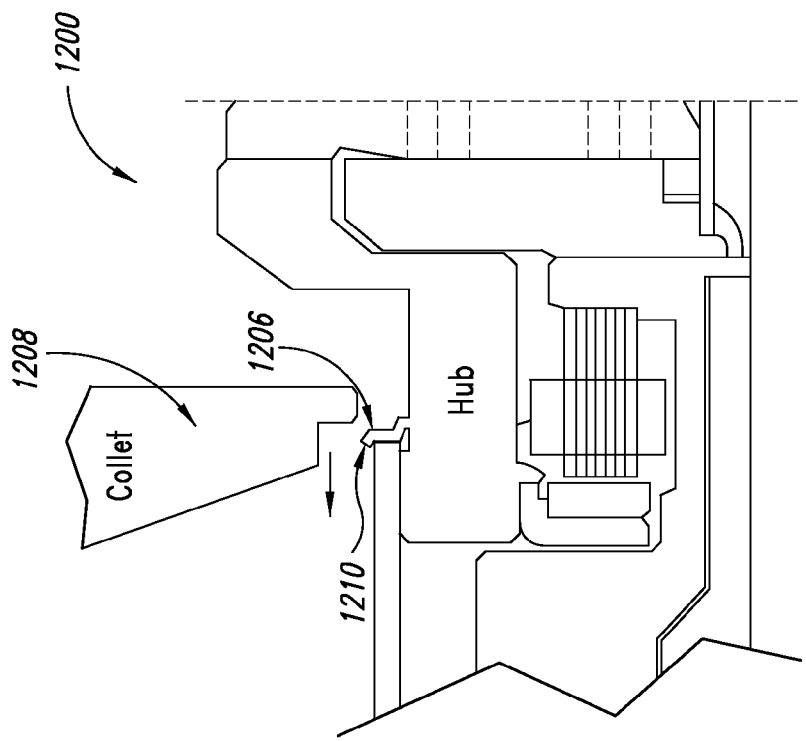
FIG. 12B is a cross-sectional, schematic view of the exemplary spindle motor and the disk of FIG. 12A, wherein a swage ring of the spindle motor has been swaged radially into contact with the disk, according to one illustrated embodiment.
Figures 13A, 13B:
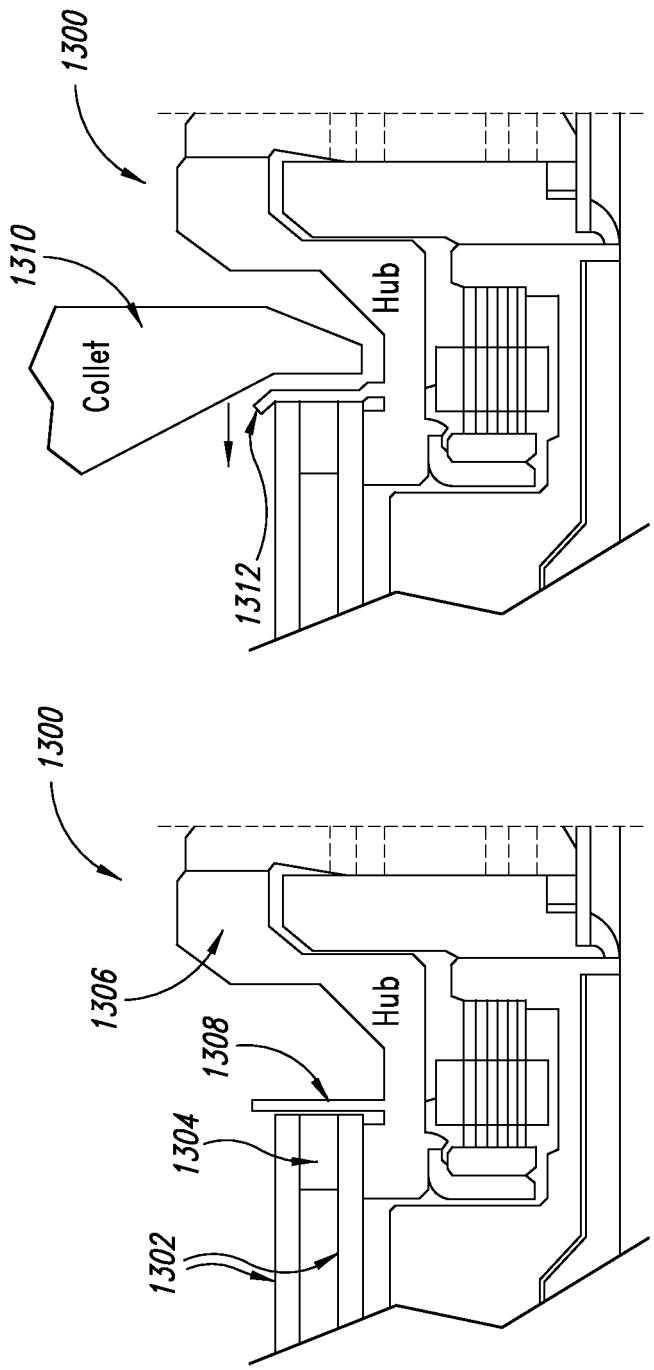
FIG. 13A is a cross-sectional, schematic view of another exemplary spindle motor having two disks positioned thereon, according to one illustrated embodiment.
FIG. 13B is a cross-sectional, schematic view of the exemplary spindle motor and the disks of FIG. 13A, wherein a swage ring of the spindle motor has been swaged radially into contact with the disks, according to one illustrated embodiment.

Of course, in other embodiments, the collet 1000 may have a different geometry. For example, the collet 1000 may have a substantially uniform radius along a length of the collet 1000 that acts to swage the swage ring 904 (as illustrated in FIGS. 12B and 13B). In still other embodiments, a profile of the collet 1000 may be chosen based at least in part on a profile of the swage ring 904.

Figure 12A:
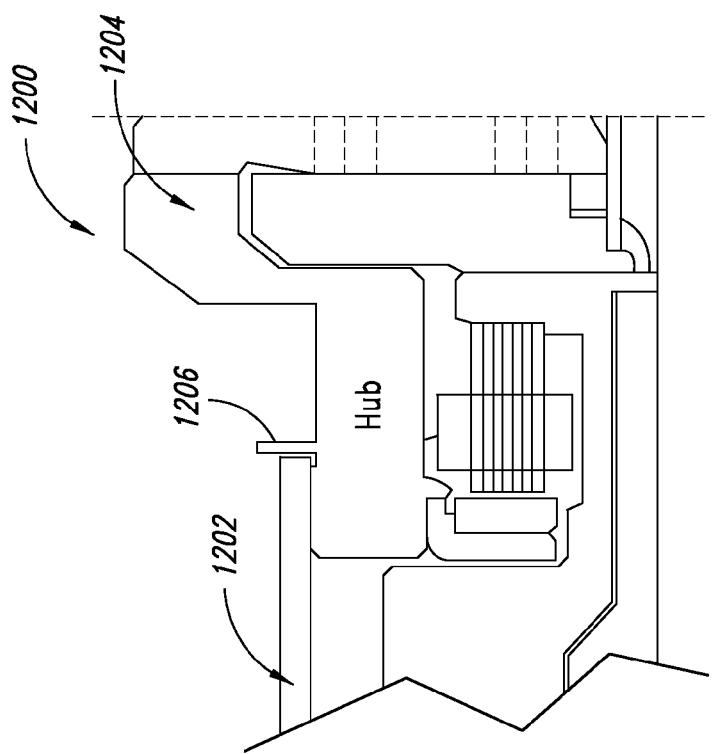
FIG. 12A is a cross-sectional, schematic view of an exemplary spindle motor having a disk positioned thereon, according to one illustrated embodiment.

FIG. 12A shows an exemplary spindle motor 1200 having a disk 1202 positioned thereon, according to one embodiment. As illustrated, the spindle motor 1200 includes a motor hub 1204 defining a swage ring 1206. In this embodiment, the motor hub 1204 is designed to accommodate a single disk 1202. However, in other embodiments, a greater number of disks may, of course, be employed.

The motor hub 1204 and the disk 1202 are configured generally similarly to the motor hub 900 and the disk 902 discussed above with reference to FIG. 9. However, as illustrated, the swage ring 1206 defines a relatively simple cylindrical profile without some of the more complex geometric features of the swage ring 904.

FIG. 12B shows the spindle motor 1200 after the swage ring 1206 has been swaged radially into contact with the disk 1202. As illustrated, a collet 1208 has been used to swage the swage ring 1206 radially outwards. A top portion 1210 of the swage ring 1206 has also been flared outwardly beyond a diameter of an opening of the disk 1202. Thus, the swage ring 1206 may form an interference fit with the disk 1202 along the opening of the disk 1202, and the top portion 1210 of the swage ring 1206 may exert an axial force against a top surface of the disk 1202.

In one embodiment, the collet 1208 may carry out two distinct swaging operations in order to swage the top portion 1210 of the swage ring 1206 beyond the opening of the disk 1202. For example, the collet 1208 may first swage a middle portion of the swage ring 1206 into contact with the opening of the disk 1202. The collet 1208 may then be moved upwards relative to the swage ring 1206 and may then swage the top portion 1210 of the swage ring 1206 outwardly beyond the diameter of the opening of the disk 1202. Of course, in other embodiments, other structures or manufacturing methods may be used to flare the top portion 1210 of the swage ring 1206 radially outwards. For example, the top portion 1210 of the swage ring 1206 itself may have an increased radial thickness compared to a middle portion of the swage ring 1206, such that at least some material from the top portion 1210 is swaged further outwards than the middle portion.

The swaging process described herein may be substantially self-centering. That is, if the disk 1202 is positioned off-center initially, the swaging process may generally center the disk 1202 relative to the swage ring 1206.

In one embodiment, the spindle motor 1200 and the disk 1202 may be configured to enable re-working. For example, a re-working tool (not shown) might engage an outer diameter of the top portion 1210 of the swage ring 1206. This re-working tool might deform the swage ring 1206 back towards its original shape until the swage ring 1206 has a sufficiently small diameter to allow the disk 1202 to slip off the motor hub 1204. The swage ring 1206 could subsequently be resized using a sizing collet (also not shown) in preparation for future use.

FIG. 13A shows another exemplary spindle motor 1300 having two disks 1302 positioned thereon, according to one embodiment. A disk spacer 1304 is also positioned between the two disks 1302 and may have any of a variety of heights. As illustrated, the spindle motor 1300 includes a motor hub 1306 defining a swage ring 1308. The spindle motor 1300 may be configured generally similarly to the spindle motor 1200 described above.

FIG. 13B shows the spindle motor 1300 after the swage ring 1308 has been swaged radially into contact with the two disks 1302. As illustrated, a collet 1310 (configured similarly to the collet 1208 discussed above) has been used to swage the swage ring 1308 radially outwards. A top portion 1312 of the swage ring 1308 has also been flared outwardly beyond a diameter of an opening of the disks 1302. Thus, the swage ring 1308 may form an interference fit with the disks 1302 as well as the disk spacer 1304, and the top portion 1312 of the swage ring 1308 may exert an axial force against a top surface of the top disk 1302.

Figures 14, 15:
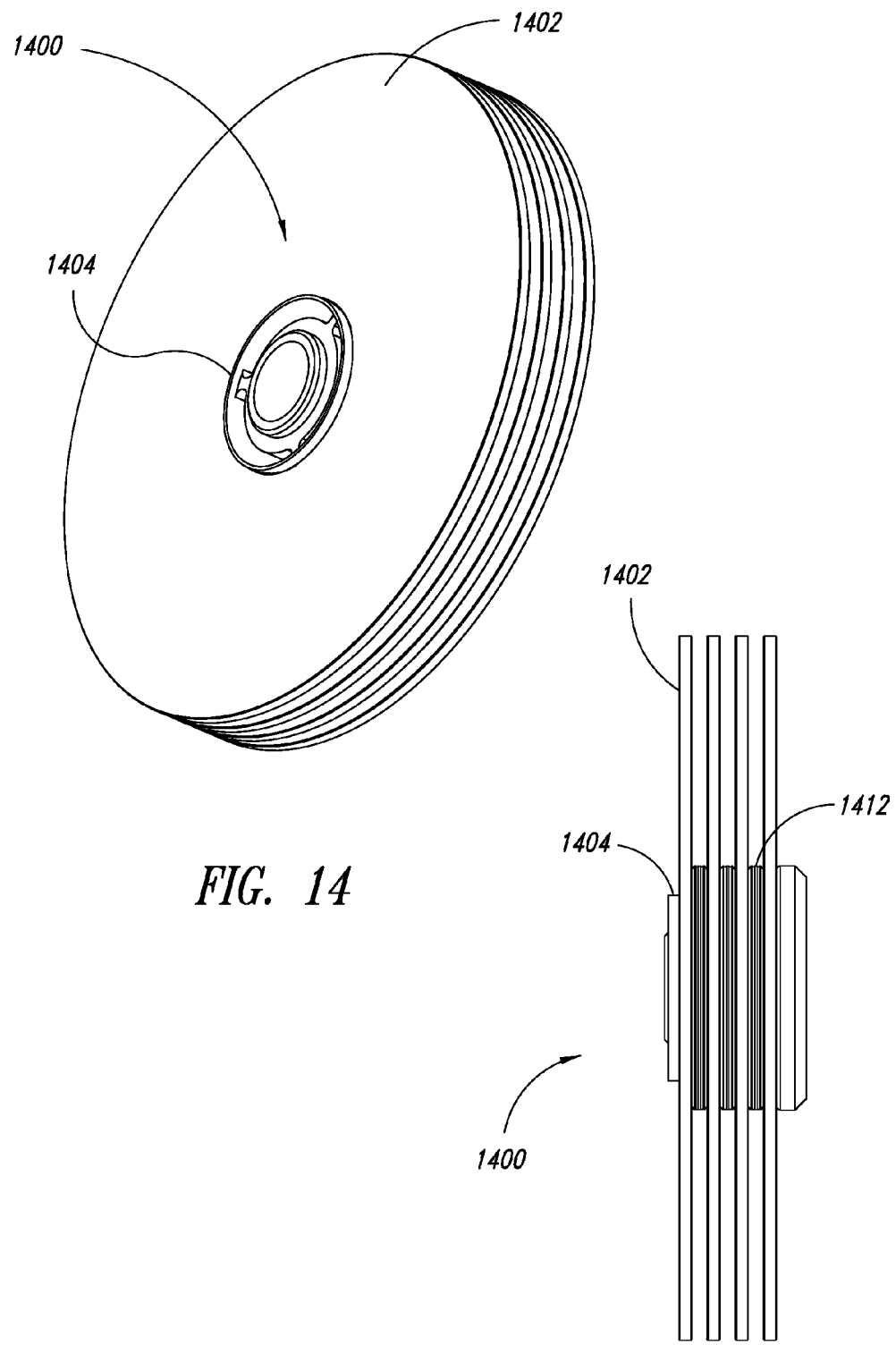
FIG. 14 is a perspective view of another exemplary motor hub having a plurality of disks positioned thereon, according to one illustrated embodiment.
FIG. 15 is a side view of the motor hub and the disks of FIG. 14, according to one illustrated embodiment.
Figure 16:
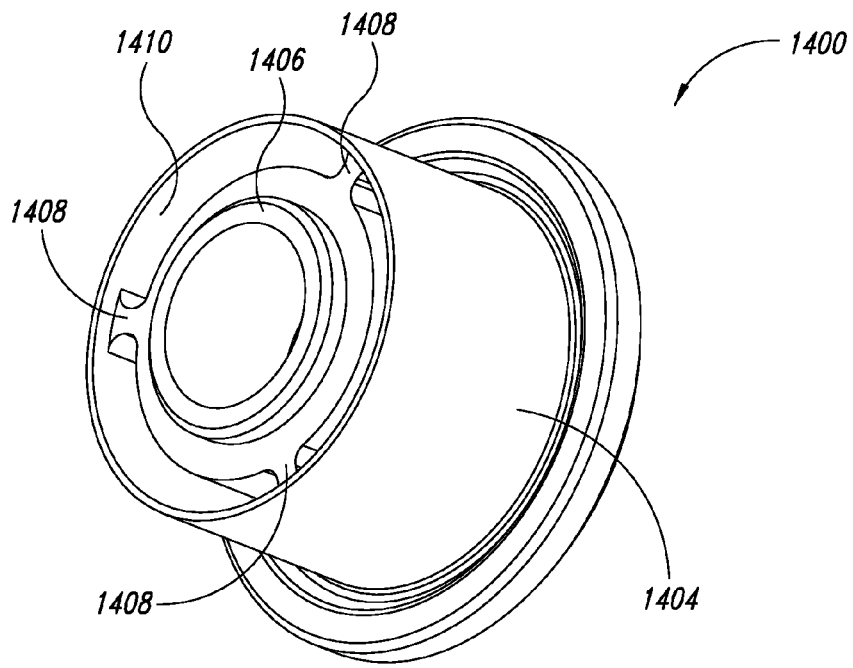
FIG. 16 is a first perspective view of the motor hub of FIG. 14, according to one illustrated embodiment.
Figure 17:
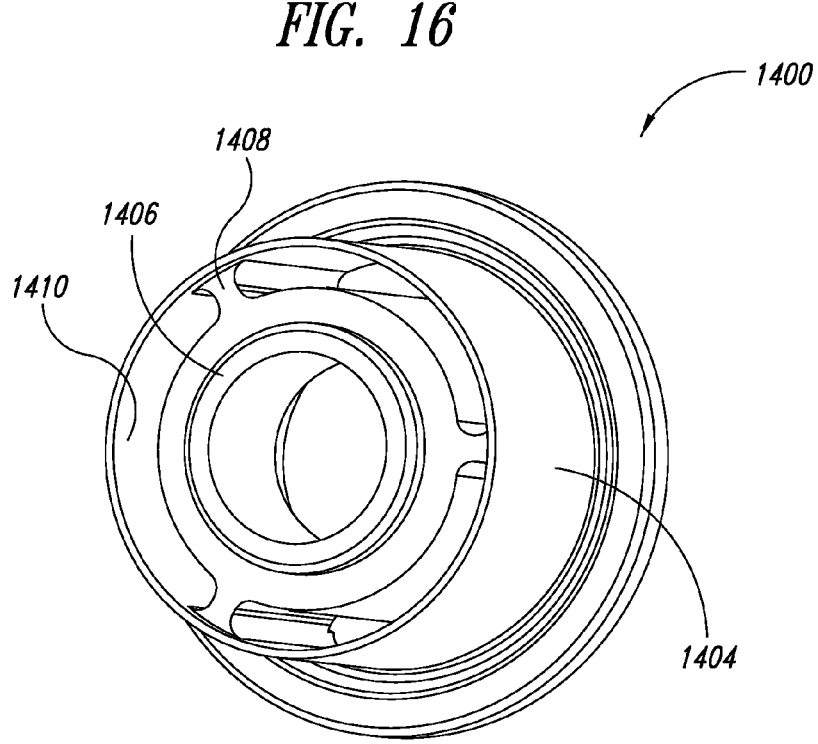
FIG. 17 is a second perspective view of the motor hub of FIG. 14, according to one illustrated embodiment.
Figure 18:
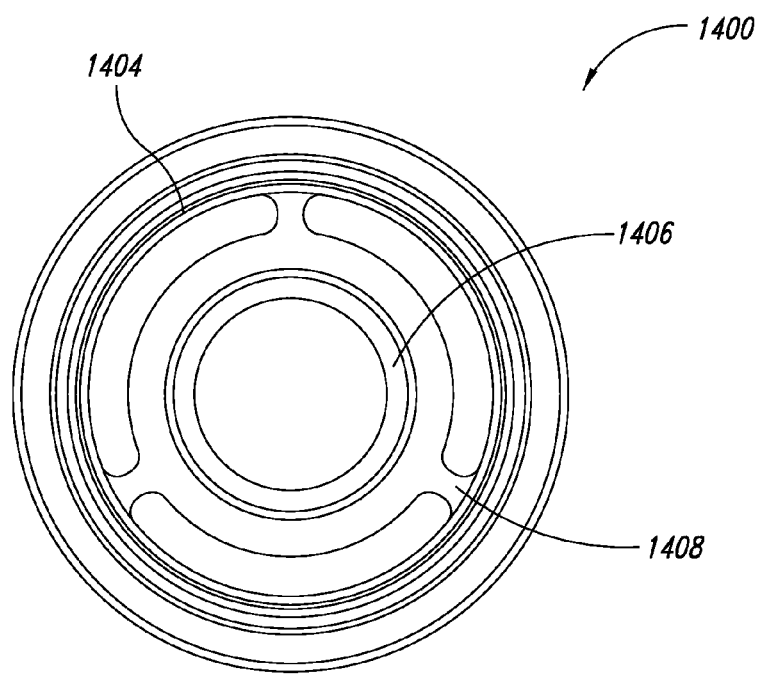
FIG. 18 is a top view of the motor hub of FIG. 14, according to one illustrated embodiment.
Figure 19:
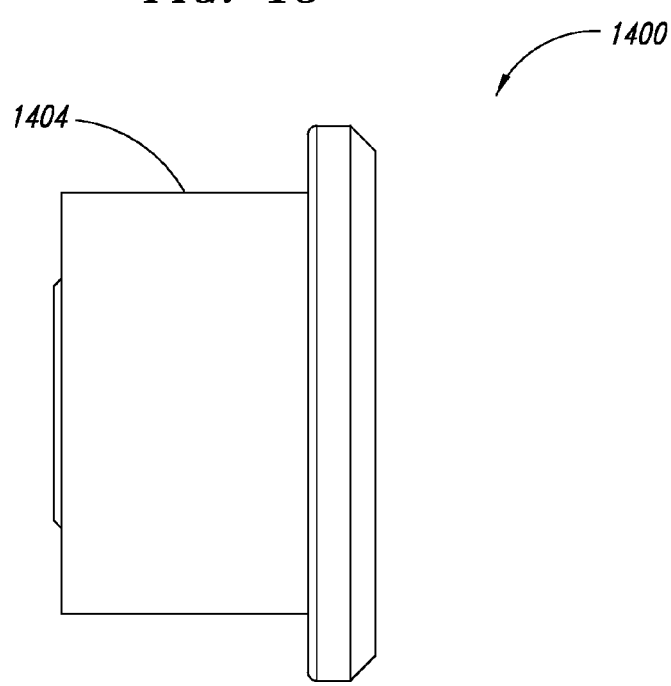
FIG. 19 is a side view of the motor hub of FIG. 14, according to one illustrated embodiment.

FIGS. 14 and 15 show another exemplary motor hub 1400 having a plurality of disks 1402 positioned thereon, according to one illustrated embodiment. FIG. 14 shows a perspective view of the motor hub 1400 and disks 1402, while a side view is presented in FIG. 15. FIGS. 16-19 show various views of the motor hub 1400 without the disks 1402. FIGS. 16 and 17 show different perspective views of the motor hub 1400, while top and side views are shown in FIGS. 18 and 19, respectively.

As shown in these Figures, the motor hub 1400 defines a swage ring 1404. As described above, the swage ring 1404 may comprise any of a variety of generally ring-shaped features that may be swaged radially outwards into contact with the disks 1402. In one embodiment, the motor hub 1400 may further define a central post 1406, and the swage ring 1404 may be coupled to the central post 1406 by a plurality of spokes 1408 extending radially between an inner surface 1410 of the swage ring 1404 and the central post 1406. Although three spokes 1408 are illustrated in the Figures, more or fewer spokes 1408 may couple the swage ring 1404 to the central post 1406 in other embodiments.

In one embodiment, the plurality of spokes 1408 may comprise a plurality of connecting walls extending along substantially the entire axial height of the swage ring 1404, as illustrated. However, in other embodiments, the spokes 1408 may only extend along some fraction of the height of the swage ring 1404. Indeed, the spokes 1408 may be formed in accordance with any of a number of different geometries and sizes.

In one embodiment, the motor hub 1400 and the spokes 1408 are monolithic. In other embodiments, however, the motor hub 1400 and the spokes 1408 may be formed separately, and the spokes 1408 may be coupled between the central post 1406 and the swage ring 1404 in any of a variety of ways, such as via adhesives, metallic bonding, mechanical bonding, etc. The spokes 1408 may also be metallic and may be made from the same material as the swage ring 1404. However, in other embodiments, other types of materials may also be used.

In some embodiments, the spokes 1408 may act to strengthen the swage ring 1404 and may be especially useful when retaining multiple disks 1402. As illustrated, the swage ring 1404 extends axially through the combined height of multiple disks 1402 and associated spacers 1412. In order to improve the stiffness of this relatively tall swage ring 1404, the spokes 1408 may act as reinforcement members, coupling the swage ring 1404 to the relatively stiff central post 1406. Of course, in other embodiments, spokes may be implemented in motor hubs used to retain any number of disks, even a single disk.

Figure 20:
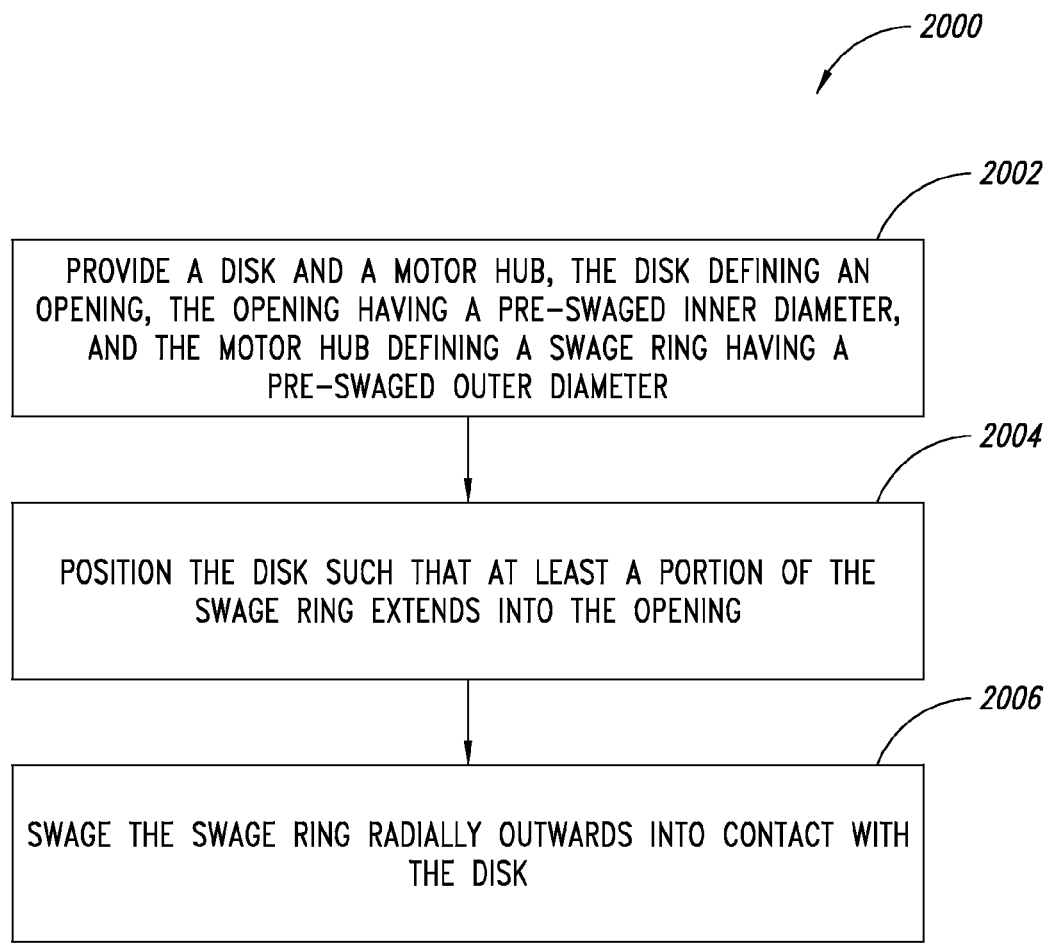
FIG. 20 illustrates a flow chart for a method of manufacturing a disk drive, according to one illustrated embodiment.

FIG. 20 illustrates a flow chart for a method 2000 of manufacturing a disk drive, according to one illustrated embodiment. This method 2000 will be discussed in the context of the spindle motor 1200 and disk 1202 of FIGS. 12A and 12B. However, the acts disclosed herein may be executed using a variety of spindle motors, motor hubs and disks (including all of the configurations illustrated in FIGS. 1-19), in accordance with the described method.

As described herein, all of the acts comprising the method 2000 may be orchestrated by a processor according to an automatic disk attachment algorithm, based at least in part on computer-readable instructions stored in computer-readable memory and executable by the processor. Of course, a manual implementation of the method 2000 may also be employed.

At act 2002, a disk 1202 and a motor hub 1204 are provided, the disk 1202 defining an opening, the opening having a pre-swaged inner diameter, and the motor hub 1204 defining a swage ring 1206 having a pre-swaged outer diameter. The disk 1202 and the motor hub 1204 may be provided in any of a variety of ways. In one embodiment, the disk 1202 and a spindle motor 1200 including the motor hub 1204 may be provided at a manufacturing station, at which the components may be coupled in accordance with the method 2000.

The opening of the disk 1202 may have a pre-swaged inner diameter and a swaged inner diameter. During the swaging process, the inner diameter of the opening of the disk 1202 may be at least slightly enlarged due to the pressure exerted radially outwards by a collet or other expansion tool. Similarly, the swage ring 1206 may also have a pre-swaged outer diameter and a swaged outer diameter.

As described above, in one embodiment, a ratio of the pre-swaged inner diameter of the opening to the pre-swaged outer diameter of the swage ring 1206 may be less than or equal to 1.05. In another embodiment, the ratio of the pre-swaged inner diameter of the opening to the pre-swaged outer diameter of the swage ring 1206 may be less than or equal to 1.005.

In one embodiment, providing the disk 1202 and the motor hub 1204 may include machining the motor hub 1204 to define the swage ring 1206. In such an embodiment, the motor hub 1204 may be machined in a variety of ways. For example, a lathe or mill may be used to define the swage ring 1206. In another embodiment, the swage ring 1206 may be defined during a casting process.

Providing the disk 1202 and the motor hub 1204 may further include machining the disk 1202 to define the opening. Again, a lathe or mill may be used to define the opening in the disk 1202. In other embodiments, other methods of defining the opening through the disk 1202 may be used (e.g., by stamping).

At act 2004, the disk 1202 is positioned such that at least a portion of the swage ring 1206 extends into the opening of the disk 1202. As illustrated in FIG. 12A, the disk 1202 may be positioned such that it is substantially concentric with the swage ring 1206. In one embodiment, an automated placement tool (not shown) may be used to position the disk 1202 with respect to the swage ring 1206. However, in other embodiments, the disk 1202 may be manually positioned.

As illustrated in FIG. 12A, the disk 1202 may be positioned such that a bottom surface of the disk 1202 is spaced apart axially from a base of the swage ring 1206 by an axial gap. In one embodiment, the axial gap may be greater than or equal to a radial thickness of the swage ring 1206. Of course, in other embodiments, larger or smaller axial gaps may be employed.

At act 2006, the swage ring 1206 is swaged radially outwards into contact with the disk 1202. By swaging the swage ring 1206 radially outwards into contact with the disk 1202, an interference fit may be formed between the swage ring 1206 and the disk 1202, thereby retaining the disk 1202 on the motor hub 1204. In some embodiments, the disk 1202 may be further secured by swaging a top portion of the swage ring 1206 to flare outwardly beyond a swaged diameter of the opening of the disk 1202, as illustrated in FIG. 12B.

The swage ring 1206 may be swaged radially outwards using any of a variety of expansion tools. In one embodiment, as illustrated in FIG. 12B, a collet 1208 may be inserted at least partially within a recess defined by the motor hub 1204. The collet 1208 may then be radially expanded in order to swage the swage ring 1206 radially outwards into contact with the disk 1202.

In some embodiments, as illustrated in FIG. 10, the collet may also include a lower section associated with a first radius, and an upper section associated with a second radius larger than the first radius. In such an embodiment, radially expanding the collet may further include radially expanding the lower section of the collet in order to swage the swage ring 1206 radially outwards into contact with the disk 1202 and radially expanding the upper section of the collet to flare a top portion of the swage ring 1206 outwardly beyond a swaged diameter of the opening.

The foregoing detailed description has set forth various embodiments of the devices and/or processes via the use of block diagrams, schematics, and examples. Insofar as such block diagrams, schematics, and examples contain one or more functions and/or operations, each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, the embodiments disclosed herein, in whole or in part, can be equivalently implemented in standard integrated circuits, as one or more programs executed by one or more processors, as one or more programs executed by one or more controllers (e.g., microcontrollers), as firmware, or as virtually any combination thereof.

We claim:

1. A disk drive comprising:
   a disk defining an annular opening, a disk surface and a thickness;
   a motor hub coupled to the disk, the motor hub defining a motor hub surface that faces the disk surface; and
   a continuous and cylindrical swage ring that extends from the motor hub surface at least across the thickness of the disk,
   wherein the swage ring is configured to fit within the annular opening of the disk and swaged radially outwards into contact with the disk.

2. The disk drive of claim 1, wherein the motor hub and the swage ring are monolithic.

3. The disk drive of claim 1, wherein the swage ring forms an interference fit with the disk.

4. The disk drive of claim 1, wherein a top portion of the swage ring flares outwardly beyond a diameter of the annular opening of the disk.

5. The disk drive of claim 1, wherein the disk and the swage ring comprise aluminum.

6. The disk drive of claim 1, wherein a bottom surface of the disk is spaced apart axially from a base of the swage ring by an axial gap.

7. The disk drive of claim 6, wherein the axial gap is greater than or equal to a radial thickness of the swage ring.

8. The disk drive of claim 1, wherein a top surface of the swage ring is positioned within the opening between a bottom surface of the disk and a top surface of the disk.

9. The disk drive of claim 1, wherein the motor hub further defines a central post, and the swage ring is coupled to the central post by a plurality of spokes extending radially between an inner surface of the swage ring and the central post.

* * * * *